(12) United States Patent
Periasamy

(10) Patent No.: US 10,080,011 B1
(45) Date of Patent: Sep. 18, 2018

(54) LIGHT FIELD IMAGING APPARATUS

(71) Applicant: Intel Corporation, Santa Clara, CA (US)

(72) Inventor: Chandru Periasamy, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/491,343

(22) Filed: Apr. 19, 2017

(51) Int. Cl.
*G02B 6/06* (2006.01)
*H04N 13/204* (2018.01)
*H04N 13/02* (2006.01)
*G02B 6/08* (2006.01)
*G02B 3/00* (2006.01)
*G02B 6/28* (2006.01)
*G06T 7/00* (2017.01)
*G06T 7/62* (2017.01)

(52) U.S. Cl.
CPC ......... *H04N 13/204* (2018.05); *G02B 3/0056* (2013.01); *G02B 6/08* (2013.01); *G02B 6/2856* (2013.01); *H04N 13/0203* (2013.01); *G06T 7/0004* (2013.01); *G06T 7/62* (2017.01); *G06T 2207/10052* (2013.01); *G06T 2207/30141* (2013.01); *H04N 2213/001* (2013.01)

(58) Field of Classification Search
None
See application file for complete search history.

(56) References Cited

U.S. PATENT DOCUMENTS

2016/0091705 A1* 3/2016 Ben Ezra ............. G02B 21/361 348/79
2017/0243373 A1* 8/2017 Bevensee .................. G06T 7/80

\* cited by examiner

*Primary Examiner* — Sung Pak
(74) *Attorney, Agent, or Firm* — Schwabe, Williamson & Wyatt, P.C.

(57) ABSTRACT

Embodiments of the present disclosure provide for a light field imaging apparatus and method. In one embodiment, an apparatus may comprise one or more imaging modules that may include a lens array, to receive a light field of a surface of an object or scene, and a fiber optic image transferring device having a first end and a second end. The fiber optic image transferring device may be coupled with the lens array at the first end, to transfer the light field to the second end. The apparatus may further include an image sensor coupled with the second end of the fiber optic image transferring device, to register the transferred light field and provide the registered light field for processing. Other embodiments may be described and/or claimed.

13 Claims, 7 Drawing Sheets

LIGHT FIELD IMAGING APPARATUS

FIELD

Embodiments of the present disclosure generally relate to the field of metrology and in particular to techniques for light field imaging that may be used for surface inspection of objects, such as printed circuit boards.

BACKGROUND

Fabrication of printed circuit boards (PCB), such as motherboards may require high accuracy measurements of solder paste deposit volume, height, and alignment on all areas of the PCB, for example, after the paste print step in the surface mount technology (SMT) process. The required resolution may be measured in the sub-micron regime as package sizes are decreasing and the feature size and their pitch are following suit. However, the commercially available light field imaging may not be used for this purpose at this time, and moreover may not satisfy the high resolution requirement.

There is also a need to monitor how much a PCB and/or the components disposed on it may deform when the PCB is taken through the SMT reflow oven. Such measurements may need to be conducted in-situ, which means the imaging apparatus may need to travel along with the PCB through the oven. However, the space available above the board inside the oven is limited and may reach about 50 mm, so a provision of the imaging apparatus in-situ may face substantial technological constraints.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure include techniques and configurations for a light field imaging system, method, and apparatus. In some embodiments, a light field imaging apparatus may comprise one or more imaging modules that may include a lens array, to receive a light field of a surface of an object or scene, and a fiber optic image transferring device having a first end and a second end. The fiber optic image transferring device may be coupled with the lens array at the first end, to transfer the light field to the second end. The apparatus may further include an image sensor coupled with the second end of the fiber optic image transferring device, to register the transferred light field and provide the registered light field for processing.

In the following detailed description, reference is made to the accompanying drawings that form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment" or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Figure 1:
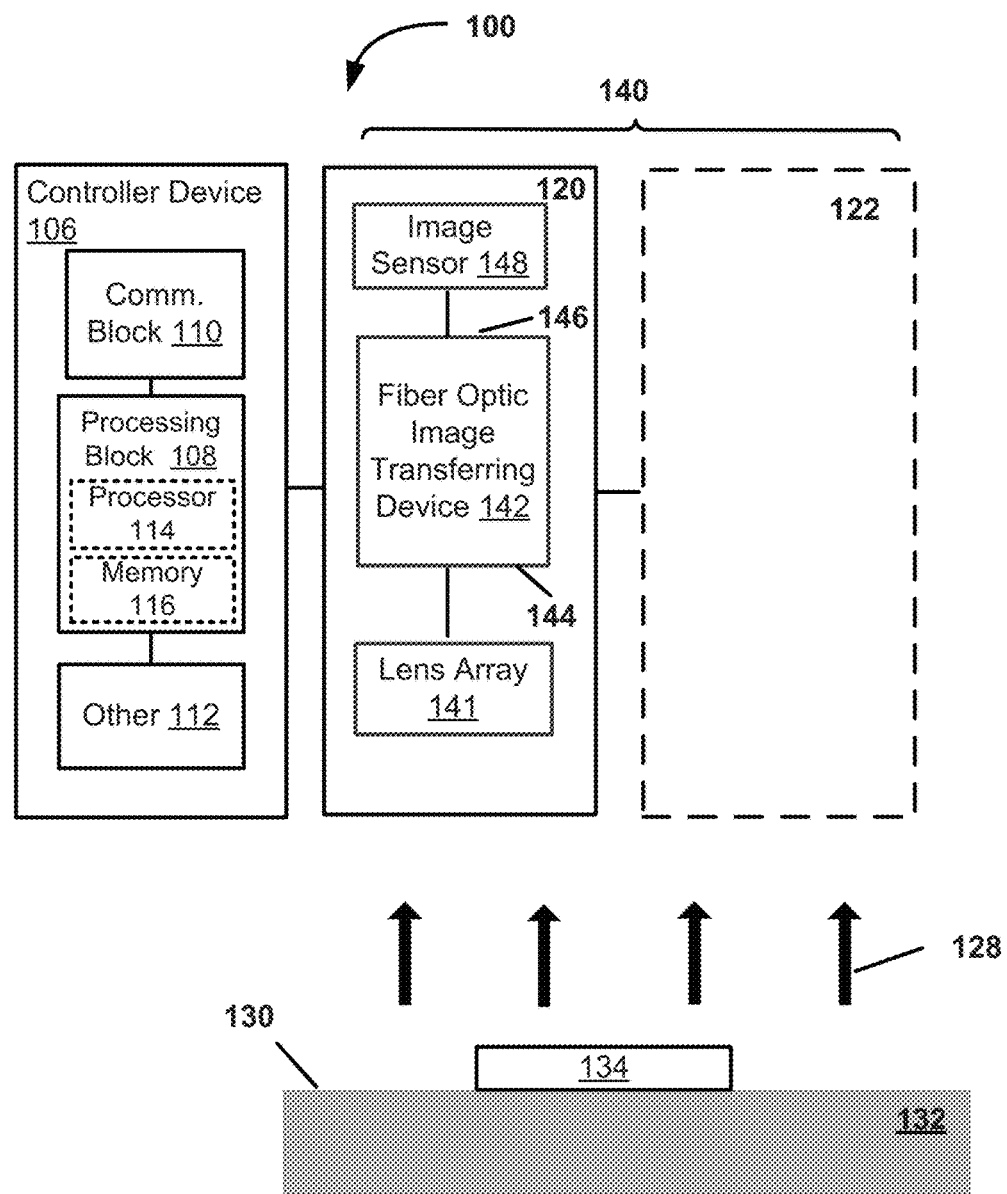
FIG. 1 illustrates an example apparatus for light field imaging, in accordance with some embodiments.

FIG. 1 illustrates an example apparatus for light field imaging, in accordance with some embodiments. In some embodiments described below in greater detail, the apparatus 100 may be used for inspecting and providing measurements of a surface of an object, such as a PCB (e.g., motherboard) or, more generally, any object or scene. For example, the apparatus 100 may be used to measure parameters (e.g., volume, height, evenness or the like) of deposit of a material (e.g., solder paste) on a surface of a PCB. In general, the apparatus 100 may be used to capture a light field associated with any object or scene having multiple objects. For ease of explanation, objects or scenes to be captured by the apparatus 100 will be called "object" hereinafter.

Figure 2:
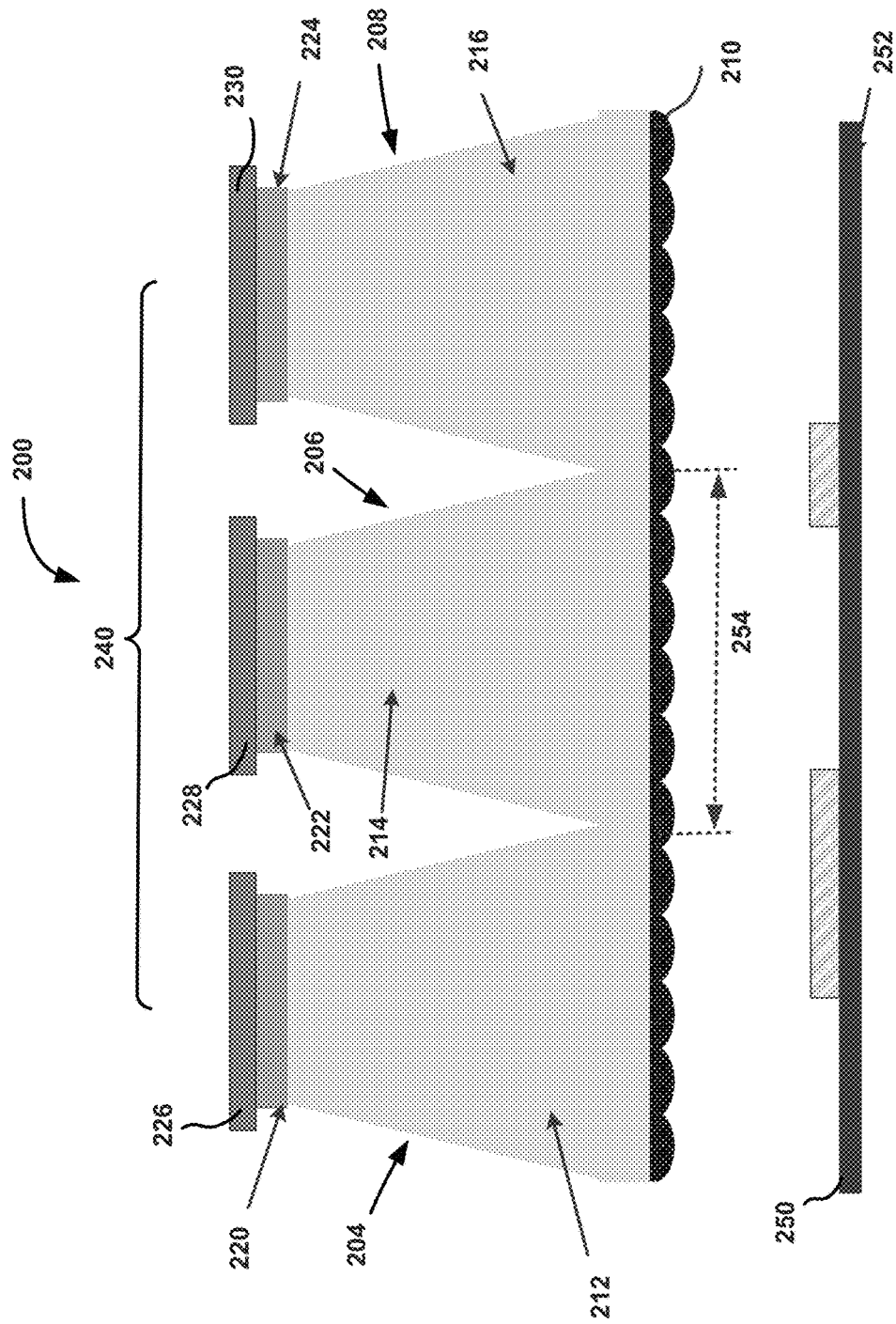
FIG. 2 illustrates some aspects of an example apparatus for light field imaging, in accordance with some embodiments.

In embodiments, the apparatus 100 may include one or more imaging modules 120, 122, to provide an image of a light field 128 of a surface 130 of an object under inspection, e.g., a PCB 132. As shown, the PCB 132 may have one or more components 134 (e.g., packages and/or passive components) attached to the surface 130. In embodiments, the imaging modules 120, 122 may be arranged in an array 140, in a particular disposition to provide a desired field of view (FOV). For example, the array 140 may be arranged in a one-dimensional (1D) or two-dimensional (2D) dispositions, some of which are described below. Such dispositions may vary depending on particular characteristics (e.g., length, width etc.) of a surface 130 of an object under inspection, and further depending on the optical characteristics of the module components. Two imaging modules 120, 122 are shown in FIG. 2 for purposes of explanation. It will be understood, that any number of imaging modules may be provided in the apparatus 100 in order to capture the desired FOV (e.g., full surface of an object).

An imaging module of the apparatus 100 (e.g., module 120) may include a lens array (e.g., micro lens array) 141 configured to receive and pass on the light field 128 emitted (e.g., reflected) by the surface 130 of the PCB 132. As known, a single lens of a micro lens array may capture intensity and/or color components of the light field (in other words, the scene in front of the imaging apparatus). Multiple lenses in the array 141 may be configured to focus on one or more common points on the surface 130. Multiple viewpoints (perspectives) of the common points may be obtained. The relative positions of each micro lens in the array 141 may be known. For example, the positions may be computed using a calibration routine prior to capturing any scene. Accordingly, the angular and depth information of a surface image may be obtained, for example, by post processing of the raw image (e.g., intensity image) while using information about the micro lens parameters such as numerical aperture, relative position between each micro lens, etc.

In summary, the phase (or angular) components of the image (light field) may be obtained by post processing. As a result, the intensity (and/or color) and the phase information of the light field may be known. In view of the above considerations and for ease of understanding, the image of the scene in front of the apparatus 100 captured by the lens array 141 and further manipulated by the apparatus 100 as described below will be called hereinafter "the light field" or "image" and will be used interchangeably.

The imaging module 120 of the apparatus 100 may further include a fiber optic image transferring device 142 coupled with the lens array 141 and configured to transfer the light field of the surface 132 received by the lens array 141, from a first end 144 of the device 142 to a second end 146 of the device 142. In embodiments, the fiber optic image transferring device 142 may comprise a fiber optic taper (FOT). Hereinafter, the terms fiber optic image transferring device and FOT will be used interchangeably.

In some embodiments, the first end 144 of the FOT 142 may be tapered (made smaller in size) relative to the second end 146. In some embodiments, the second end 146 of the FOT 142 may be tapered relative to the first end 144 of the FOT 142. Accordingly, the FOT 142 may be configured to transform the image that is being transferred, depending on the configuration of the device ends. For example, the light field may be magnified if the first end 144 is smaller than the second end 146. In another example, the light field may be reduced if the second end 146 is smaller than the first end 144.

In embodiments, the imaging module 120 may further include an image sensor 148 coupled with the device 142 and configure to register the light field transferred by the FOT 142 and provide the registered light field for further processing. For example, the image sensor 148 may be physically attached to the second end 146 of the device 144. In embodiments, the image sensor 148 may comprise a semiconductor charge-coupled device (CCD), a complementary metal-oxide-semiconductor (CMOS), N-type metal-oxide-semiconductor (NMOS) or other image sensor type.

In some embodiments, the overall height of the apparatus 100 may be less than 50 mm, allowing for use of the apparatus for surface imaging of PCB inside a reflow oven.

In embodiments, the apparatus 100 may be operated by a computing device. In some embodiments, the computing device (e.g., a controller device 106) may be communicatively coupled with the apparatus 100 (e.g., with imaging modules 120 and 122), as shown in FIG. 1. In some embodiments, the computing device (controller device 106) may be embedded with the apparatus 100. For example, the controller device 106 may be coupled with the image sensor 148 of the imaging module 120 (and with the image sensor of the imaging module 122, not shown in FIG. 1), to process the registered light field 128 of the surface 130, captured by the lens array 141 (and corresponding lens array of the imaging module 122, not shown in FIG. 1), to provide the characteristics associated with the surface 130 of the PCB 132.

The controller device 106 may be further configured to operate the lens array 141 and FOT 146, to provide optimal image (light field) acquisition. For example, the controller device 106 may control the relative positions of the surface 130, lens array 141 and FOT 142 using one or more motors.

In embodiments, the controller device 106 may comprise a processing block 108, to control the apparatus 100, and communication block 110, to communicate data associated with image processing.

The processing block 108 may comprise at least a processor 114 and memory 116. The processing block 108 may include components configured to control the apparatus 100 and process the images of surfaces of objects under inspection, such as PCB 132. The processing block 108 may provide these components through, for example, a plurality of machine-readable instructions stored in the memory 116 and executable on the processor 114. For example, the processing block 108 may execute a control program for package inspection that may be based on LabVIEW® integrated development environment. The processor 114 may include, for example, one or more processors situated in separate components, or alternatively one or more processing cores embodied in a component (e.g., in a System-on-a-Chip (SoC) configuration), and any processor-related support circuitry (e.g., bridging interfaces, etc.). Example processors may include, but are not limited to, various microprocessors including those in the Pentium®, Xeon®, Itanium®, Celeron®, Atom®, Quark®, Core® product families, or the like.

Examples of support circuitry may include host side or input/output (I/O) side chipsets (also known as northbridge and southbridge chipsets/components) to provide an interface through which the processor 114 may interact with other system components that may be operating at different speeds, on different buses, etc. in the controller device 106. Some or all of the functionality commonly associated with the support circuitry may also be included in the same physical package as the processor.

The memory 116 may comprise random access memory (RAM) or read-only memory (ROM) in a fixed or removable format. RAM may include volatile memory configured to hold information during the operation of device 106 such as, for example, static RAM (SRAM) or dynamic RAM (DRAM). ROM may include non-volatile (NV) memory circuitry configured based on basic input/output system (BIOS), Unified Extensible Firmware Interface (UEFI), etc. to provide instructions when the controller device 106 is activated, programmable memories such as electronic programmable ROMs (erasable programmable read-only memory), Flash, etc. Other fixed/removable memory may include, but is not limited to, electronic memories such as solid state flash memory, removable memory cards or sticks, etc.

The communication block 110 may include one or more radios capable of transmitting and receiving signals using various suitable wireless communications techniques. The controller device 106 may include other components 112 that may be necessary for functioning of the apparatus 100. Other components 112 may include, for example, hardware and/or software to allow users to interact with the controller device 106 and with apparatus 100 in general, such as, for example, various input mechanisms (e.g., microphones, switches, buttons, knobs, keyboards, speakers, touch-sensitive surfaces, etc.) and various output mechanisms (e.g., speakers, displays, lighted/flashing indicators, etc.). The hardware in other components 112 may be incorporated within the controller device 106 and/or apparatus 100 and/or may be coupled to the controller device 106 via a wired or wireless communication medium.

FIG. 2 illustrates some aspects of an example apparatus for light field imaging, in accordance with some embodiments. More specifically, FIG. 2 illustrates the imaging apparatus 200 having multiple imaging modules 204, 206, 208 (configured similar to modules 120, 122 of FIG. 1), to image a surface 250 of an object such as PCB 252. As described above, imaging modules 204, 206, 208 may include a micro lens array 210 disposed on respective FOT 212, 214, and 216. The imaging modules 204, 206, 208 may further include respective image sensors 220, 222, and 224. Image sensors 220, 222, and 224 may be disposed on respective substrates 226, 228, and 230.

The imaging modules 204, 206, 208 may be arranged in an array 240. The imaging modules 204, 206, 208 are shown for illustration purposes. As described above, any number (one or more) of imaging modules may be provided in the imaging apparatus 200, depending on technological needs. For example, one module 220 may be used in the apparatus 200. In another example, the modules 204, 206, 208 may be arranged in the array 240, fused together or unfused. Different configurations of the array 240 may be contemplated. For example, the array 240 may comprise a single row (fused or unfused), as shown in FIG. 2. In another example, the array 240 may comprise multiple rows arranged in different fashions.

In general, the arrangement of the imaging modules in the array 240 may depend on the application. If a field of view to cover (e.g., surface 250 in FIG. 2) is larger than the FOT field of view 254 (FIG. 2), there may be different options to image the entire field of view. For example, one module may be used for imaging of a portion of a field of view. The module or an object may be shifted relative to each other to capture multiple portions of the field of view one at a time and the resulting images may be stitched together.

As discussed above, in some embodiments, the FOT may have an end facing the object that may be tapered relative to the other end (coupled with an image sensor). In other words, the configuration of an FOT may be flipped compared to that discussed in reference to FIG. 2. In these embodiments, the array of imaging modules may comprise multiple rows arranged in different ways relative to each other. An example arrangement is described in reference to FIG. 3.

Figure 3:
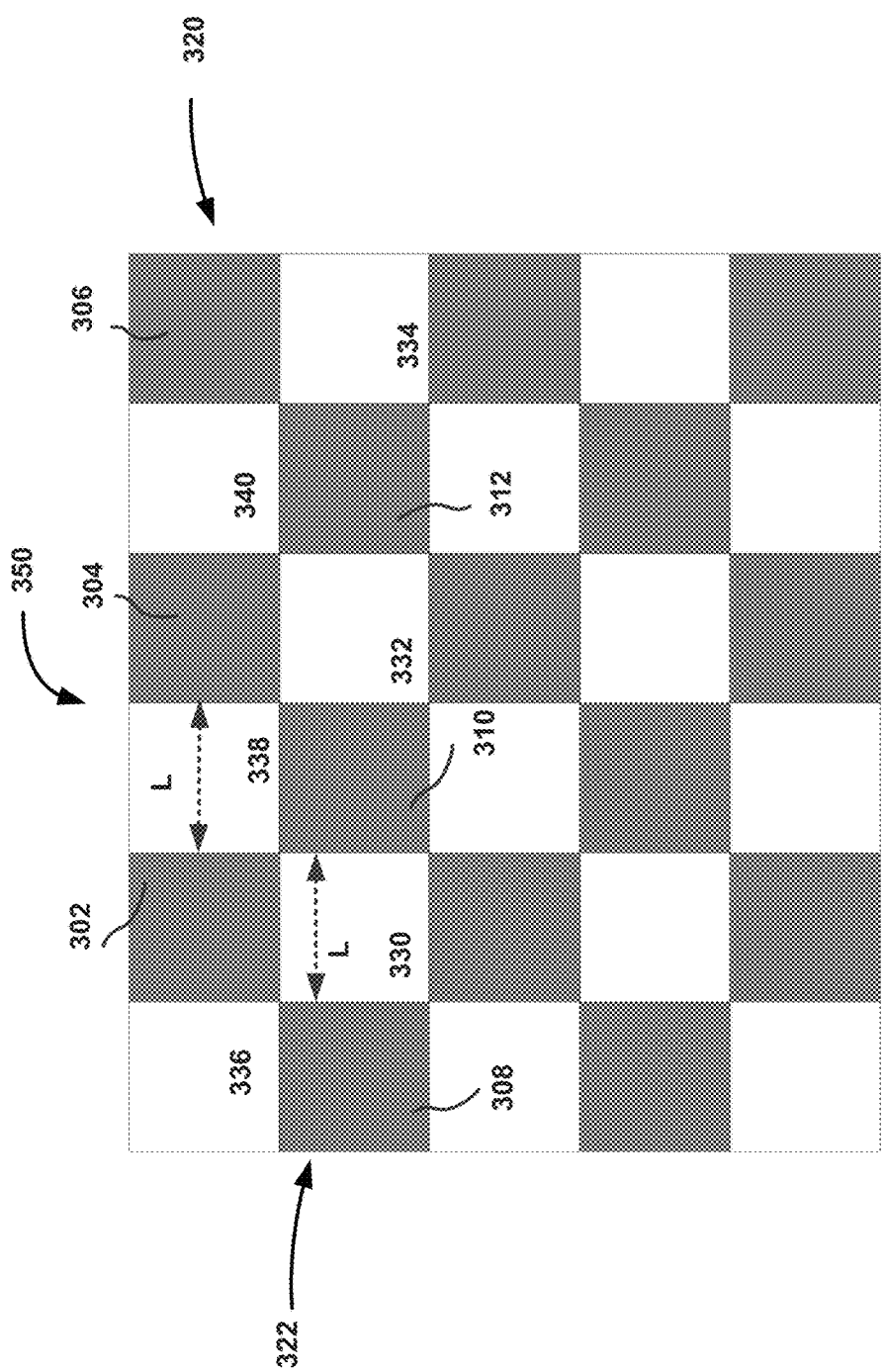
FIG. 3 illustrates various aspects of an example apparatus for light field imaging, in accordance with some embodiments.

FIG. 3 illustrates various aspects of an example apparatus for light field imaging, in accordance with some embodiments. More specifically, FIG. 3 shows a top view of an array 350 of imaging modules having FOT with tapered ends directed towards the object to be imaged. Numerals 302-312 indicate top views of respective imaging modules, such as respective substrates on which the image sensors of the respective imaging modules may be disposed. For ease of understanding, only two rows of the imaging modules of the array 350 are indicated by the numerals 320, 322. It is understood that any number of rows and any number of imaging modules in each rows may be used in the array 350.

As shown, imaging modules 302, 304, 306 may form the row 320, and imaging modules 308, 310, 312 may form the row 322. The disposition of the modules in the array 350 may be described as follows. The rows 320 and 322 may be disposed adjacent to each other. The imaging modules in each row may be disposed at a distance L from each other. As shown, the rows 320 and 322 may be shifted relative each other by the distance L. In other words, modules 302, 304, and 306 in the row 320 may be disposed next to empty spaces 330, 332, 334 in the row 322. Correspondingly, modules 308, 310, 310 may be disposed next to empty spaces 336, 338, 340 in the row 320. Accordingly, a checkered disposition of the imaging modules in the array 350 may be formed.

Figure 4:
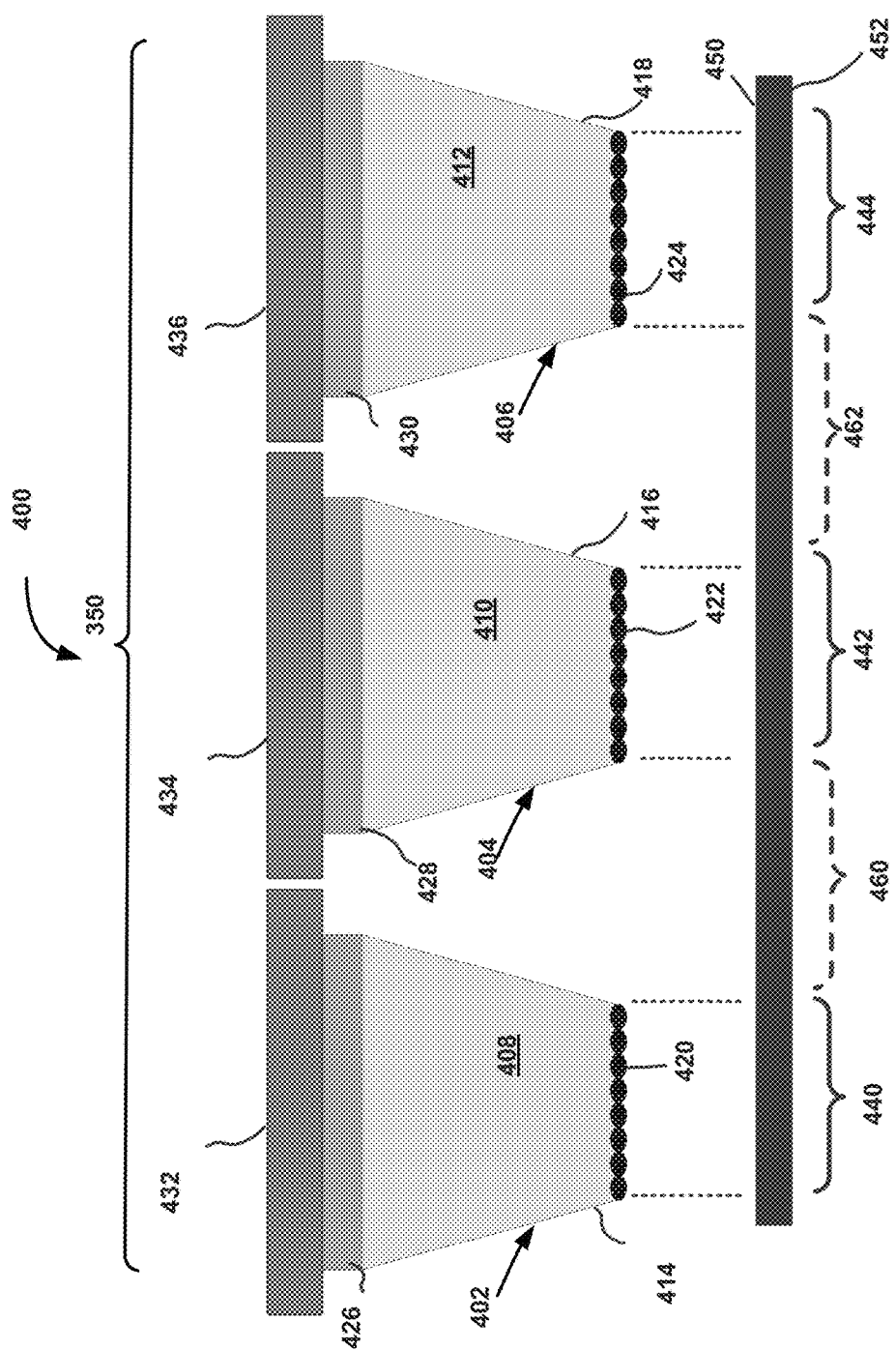
FIGS. 4-5 illustrate the example use of an apparatus for light field imaging, in accordance with some embodiments.
Figure 5:
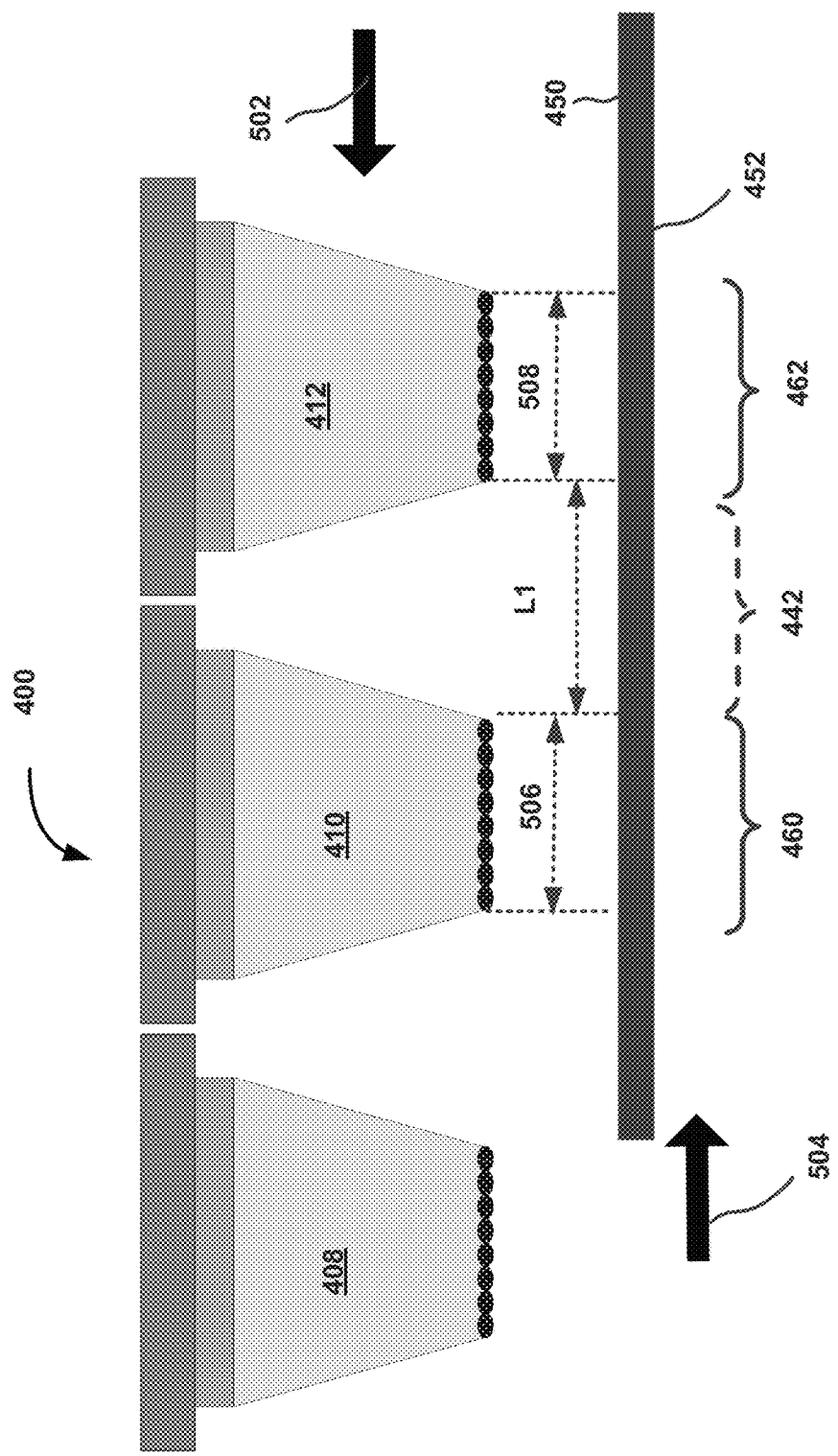

FIGS. 4-5 illustrate the example use of an apparatus for light field imaging, in accordance with some embodiments. The apparatus may include an array of imaging modules of FIG. 3. For purposes of clarity, only three imaging modules 402, 404, and 406 are shown in FIG. 4. As shown in FIG. 4, FOT 408, 410, and 412 of respective imaging modules 402, 404, and 406 have respective ends 414, 416 and 418 that are tapered and face a surface 450 of an object (e.g., PCB 452) to capture multiple fields of view of the surface 450.

Similar to the embodiments of FIG. 2, the imaging modules 402, 404, and 406 may include respective micro lens arrays 420, 422, and 424. The imaging modules 402, 404, and 406 may further include respective image sensors 426, 428, and 430 disposed on substrates 432, 434, and 436 respectively. In embodiments, the apparatus may capture an image of the surface using the imaging modules 402, 404, 406. In other words, an image captured by the apparatus may comprise an array of images captured by respective imaging modules.

As shown, due to the fields of view provided by FOT 408, 410, and 412 (indicated by vertical dotted lines), when a first light field image (or array of images) of the surface 450 is taken with the apparatus 400, areas 440, 442, and 444 of the surface 450 may be captured, and areas 460 and 462 of the surface 450 may not be captured. In order to capture the areas not captured by the first image, the apparatus 400 and the PCB 452 may be shifted relative to each other, so that the surface areas 460 and 462 may be captured with a second light field image, as shown in FIG. 5. For example, the apparatus 400 may be shifted relative to the PCB 452, as indicated by the arrow 502. In another example, the PCB 452 may be shifted relative to the apparatus 400, as indicated by the arrow 504. The length of the shift may comprise a distance L1 between the adjacent fields of view 506 and 508 corresponding to adjacent FOT (e.g., 410 and 412). Accordingly, the areas of the surface 452 that were not captured with the first light field image may be captured with the second light field image (or array of images captured by respective imaging modules), as shown in FIG. 5.

Figure 6:
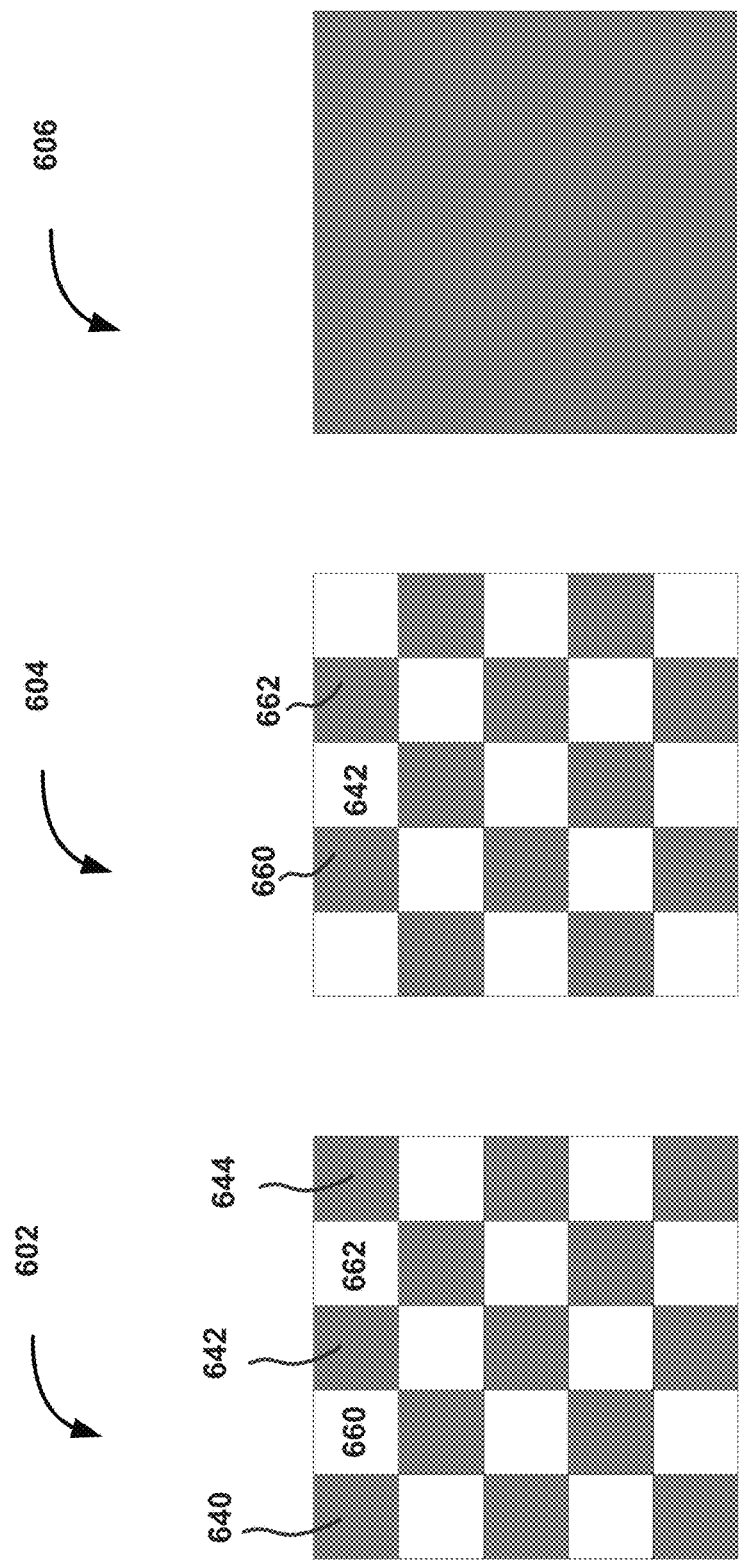
FIG. 6 illustrates images of a surface of an object captured by the apparatus for light field imaging as described in FIGS. 4-5, in accordance with some embodiments.

FIG. 6 illustrates images of a surface of an object captured by the apparatus for light field imaging as described in FIGS. 4-5, in accordance with some embodiments. The apparatus may be configured as described in reference to FIG. 3.

Image 602 illustrates the first image (e.g., array of images) of the surface 450 captured by the apparatus for light field imaging as described in reference to FIG. 4. As shown, areas 640, 642, and 644 of the image 602 correspond to surface areas 440, 442, and 444 of the surface 450. Areas 660 and 662 correspond to surface areas 460 and 462 that may not be captured with the first image 602.

Image 604 illustrates the second image of the surface 450 captured by the apparatus for light field imaging as described in reference to FIG. 5. As shown, areas 660 and 662 corresponding to surface areas 460 and 462 may be captured with the second image 604.

Image 606 illustrates an image of the surface that may comprise images 602 and 604. For example, images 602 and 604 may be stitched together during processing using various processing techniques. As shown, the resulting image 606 may provide a desired (e.g., full) field of view of the surface 450 of the PCB 452.

Figure 7:
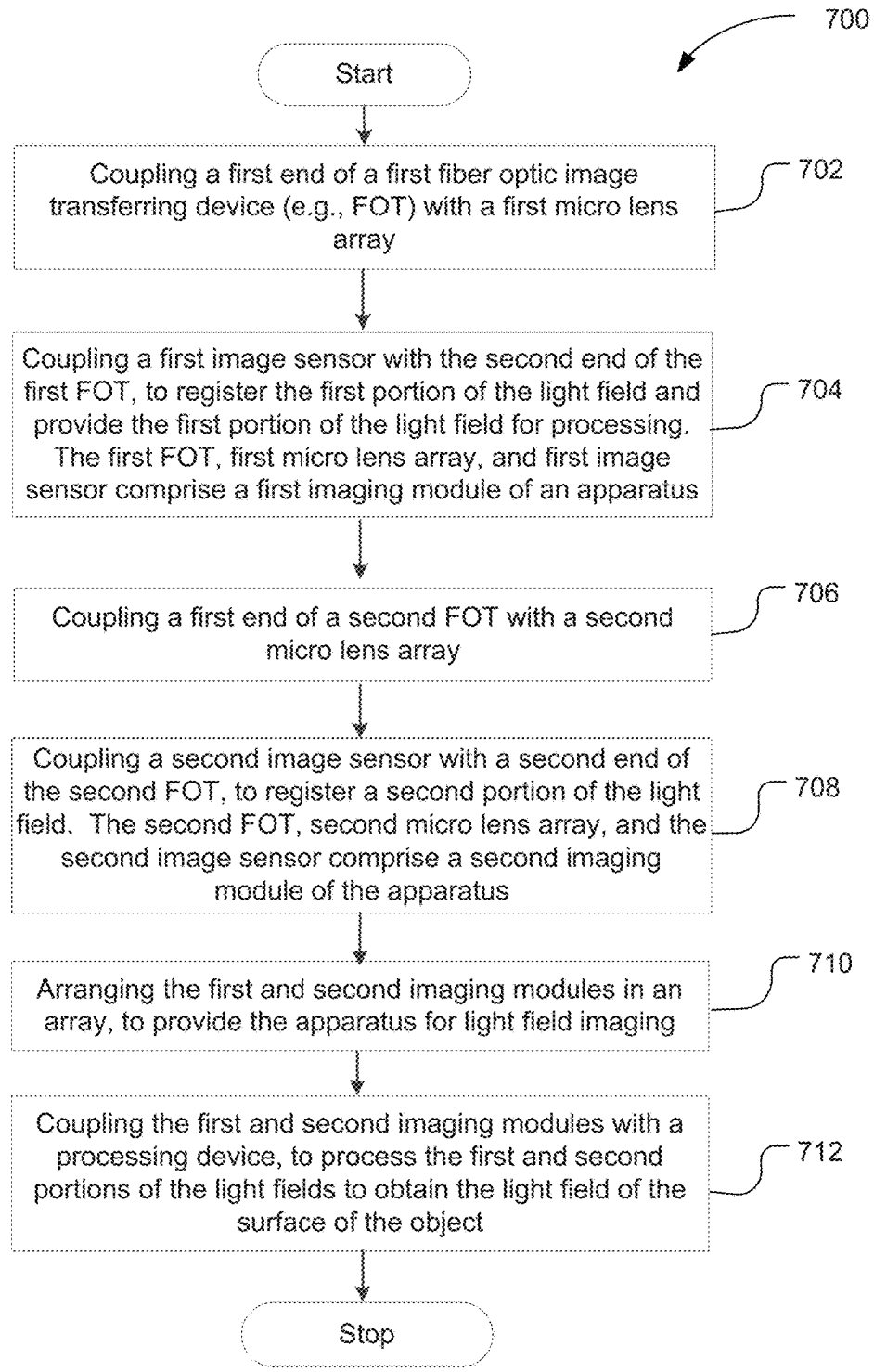
FIG. 7 is an example process flow diagram for providing an apparatus for light field imaging, in accordance with some embodiments.

FIG. 7 is an example process flow diagram for providing an apparatus for light field imaging, in accordance with some embodiments. The process 700 may comport with embodiments described in reference to FIGS. 1-4. The actions described in the process 700 may occur in different order or substantially simultaneously; the order provided below is for purposes of illustration and does not limit this disclosure.

The process 700 may begin at block 702 and include coupling a first end of a first fiber optic image transferring device (e.g., FOT) with a first micro lens array. The first micro lens array may be configured to receive a first portion of a light field of a surface of an object, and the first FOT may transfer the first portion of the light field from the first end to a second end of the FOT.

At block 704, the process 700 may include coupling a first image sensor with the second end of the first FOT, to register the transferred first portion of the light field and provide the registered first portion of the light field for processing. The first FOT, first micro lens array, and first image sensor may comprise a first imaging module of an apparatus for light field imaging.

At block 706, the process 700 may include coupling a first end of a second FOT with a second micro lens array.

At block 708, the process 700 may include coupling a second image sensor with a second end of the second FOT, to register a second portion of the light field. The second FOT, second micro lens array, and the second image sensor may comprise a second imaging module of the apparatus for light field imaging.

At block 710, the process 700 may include arranging the first and second imaging modules in an array, to provide the apparatus for light field imaging.

At block 712, the process 700 may include coupling the first and second imaging modules with a processing device, to process the first and second portions of the light fields to obtain the light field of the surface of the object.

The embodiments described herein may be further illustrated by the following examples.

Example 1 may be a light field imaging apparatus, comprising: one or more imaging modules that include: a lens array, to receive a light field of a surface of an object; a fiber optic image transferring device having a first end and a second end, wherein the fiber optic image transferring device is coupled with the lens array at the first end, to transfer the light field to the second end; and an image sensor coupled with the second end of the fiber optic image transferring device, to register the transferred light field and provide the registered light field for processing.

Example 2 may include the light field imaging apparatus of example 1, wherein the lens array comprises a micro lens array.

Example 3 may include the light field imaging apparatus of example 1, wherein the image sensor is selected from at least one of: a semiconductor charge-coupled device (CCD) or complementary metal-oxide-semiconductor (CMOS).

Example 4 may include the light field imaging apparatus of example 1, wherein the fiber optic image transferring device comprises a fiber optic taper (FOT).

Example 5 may include the light field imaging apparatus of example 4, wherein the first end of the FOT is tapered relative to the second end of the FOT.

Example 6 may include the light field imaging apparatus of example 5, wherein the one or more imaging modules comprise multiple imaging modules arranged in an array, wherein the FOT of the multiple imaging modules are fused together.

Example 7 may include the light field imaging apparatus of example 4, wherein the second end of the FOT is tapered relative to the first end of the FOT.

Example 8 may include the light field imaging apparatus of example 7, wherein the one or more imaging modules comprise multiple imaging modules arranged in an array, wherein the array comprises at least a first row of first modules and a second row of second modules disposed adjacent to the first row, wherein the first imaging modules in the first row are disposed at a distance from each other, wherein the second imaging modules in the second row are disposed at the distance from each other, wherein the first row is shifted relative to the second row by the distance.

Example 9 may include the light field imaging apparatus of example 1, further comprising: a processing device coupled with the image sensor, to process the registered light field.

Example 10 may include the light field imaging apparatus of any of examples 1 to 9, wherein the object comprises a printed circuit board (PCB).

Example 11 may be a light field imaging system, comprising: a plurality of imaging modules arranged in an array, wherein a module includes: a micro lens array, to receive a light field of a surface of an object; a fiber optic image transferring device having a first end and a second end, wherein the fiber optic image transferring device is coupled with the lens array at the first end, to transfer the light field to the second end; and an image sensor coupled with the second end of the fiber optic image transferring device, to register the transferred light field and provide the registered light field for further processing; and a processing device coupled with the plurality of light field imaging modules, to process the light field and provide a three-dimensional image data of the surface, based at least in part on a result of the processing.

Example 12 may include the system of example 11, wherein the image sensor is selected from at least one of: a semiconductor charge-coupled device (CCD) or complementary metal-oxide-semiconductor (CMOS).

Example 13 may include the system of example 11, wherein the fiber optic image transferring device comprises a fiber optic taper (FOT).

Example 14 may include the system of example 13, wherein the first end of the FOT is tapered relative to the second end of the FOT.

Example 15 may include the system of example 13, wherein the second end of the FOT is tapered relative to the first end of the FOT.

Example 16 may be a method, comprising: capturing a first array of images of a surface of an object with an imaging apparatus, the apparatus comprising a plurality of imaging modules arranged in an array, wherein each module is disposed at a distance from an adjacent module, a module includes a micro lens array, to receive a light field of a surface of an object, a fiber optic image transferring device having a first end and a second end, wherein the fiber optic image transferring device is coupled with the lens array at the first end, to transfer the light field to the second end, and an image sensor coupled with the second end of the fiber optic image transferring device, to register the transferred light field and provide the registered light field for further processing, wherein the distance is defined in part by a size of the fiber optic image transferring device; shifting the object or the apparatus by the distance relative to the apparatus or the object respectively; and capturing a second array of images of the surface of the object with the imaging apparatus, wherein the first and second array of images comprise an image of the surface of the object.

Example 17 may include the method of example 16, further comprising: disposing the imaging apparatus over the surface of the object.

Example 18 may include the method of example 16, wherein the apparatus comprises a processing device coupled with the plurality of imaging modules, wherein the method further comprises: processing the first and second arrays of images, to produce the image of the surface, wherein the processing includes stitching the first and second arrays of images.

Example 19 may include the method of any of examples 16 to 18, wherein the fiber optic image transferring device comprises a fiber optic taper (FOT), wherein the second end of the FOT is tapered relative to the first end of the FOT.

Example 20 may be a method, comprising: coupling a first end of a fiber optic image transferring device with a lens array, wherein the lens array is to receive at least a portion of a light field of a surface of an object, and wherein the fiber optic image transferring device is to transfer the portion of the light field from the first end to a second end of the optic image transferring device; and coupling an image sensor with the second end of the fiber optic image transferring device, to register the transferred portion of the light field and provide the registered portion of the light field for further processing.

Example 21 may include the method of example 20, wherein the fiber optic image transferring device comprises a fiber optic taper (FOT), wherein the lens array comprises a micro lens array.

Example 22 may include the method of example 21, wherein the at least a portion of the light field comprises a first portion of the light field, the FOT comprises a first FOT, the micro lens array comprises a first micro lens array, wherein the image sensor comprises a first image sensor, and wherein the first FOT, first micro lens array, and first image sensor comprise a first imaging module of an apparatus for light field imaging, wherein the method further comprises: coupling a first end of a second FOT with a second micro lens array; coupling a second image sensor with a second end of the second FOT, to register a second portion of the light field, wherein the second FOT, second micro lens array, and the second image sensor comprise a second imaging module of the apparatus for light field imaging; and arranging the first and second imaging modules in an array, to provide the apparatus for light field imaging.

Example 23 may include the method of example 22, further comprising: coupling the first and second imaging modules with a processing device, to process the first and second portions of the light fields to obtain the light field of the surface of the object.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A light field imaging apparatus, comprising: a plurality of imaging modules, wherein an imaging module of the plurality of imaging modules includes:
   a lens array, to receive a light field of a surface of an object;
   a fiber optic taper (FOT) having a first end and a second end, wherein the FOT is coupled with the lens array at the first end, to transfer the light field to the second end, wherein the first end of the FOT is tapered relative to the second end of the FOT; and
   an image sensor coupled with the second end of the FOT, to register the transferred light field and provide the registered light field for processing, wherein the plurality of imaging modules includes at least a first row that includes at least first and second modules, and a second row that includes at least third and fourth modules, wherein the first row is disposed parallel and adjacent to the second row, wherein the first and second imaging modules in the first row are disposed at a distance from each other, wherein the third and fourth imaging modules in the second row are disposed at the distance from each other, wherein the first module is shifted relative to the third module by the distance, and wherein the second module is shifted relative to the fourth module by the distance, such that the first, second, third, and fourth modules are disposed in a checkered pattern.

2. The light field imaging apparatus of claim 1, wherein the lens array comprises a micro lens array.

3. The light field imaging apparatus of claim 1, wherein the image sensor is selected from at least one of: a semiconductor charge-coupled device (CCD) or complementary metal-oxide-semiconductor (CMOS).

4. The light field imaging apparatus of claim 1, wherein the plurality of imaging modules comprise multiple imaging modules arranged in an array, wherein the FOT of the multiple imaging modules are fused together.

5. The light field imaging apparatus of claim 1, further comprising:
   a processing device coupled with the image sensor, to process the registered light field.

6. The light field imaging apparatus of claim 1, wherein the object comprises a printed circuit board (PCB).

7. A light field imaging system, comprising:
a plurality of imaging modules arranged in an array, wherein a module of the plurality of imaging modules includes: a micro lens array, to receive a light field of a surface of an object; a fiber optic taper (FOT) having a first end and a second end, wherein the FOT is coupled with the lens array at the first end, to transfer the light field to the second end-; and
an image sensor coupled with the second end of the FOT, to register the transferred light field and provide the registered light field for further processing, wherein the first end of the FOT is tapered relative to the second end of the FOT, wherein the array of the plurality of imaging modules comprises at least a first row that includes at least first and second modules, and a second row that includes at least third and fourth modules, wherein the first row is disposed parallel and adjacent to the second row, wherein the first and second imaging modules in the first row are disposed at a distance from each other, wherein the third and fourth imaging modules in the second row are disposed at the distance from each other, wherein the first module is shifted relative to the third module by the distance, and wherein the second module is shifted relative to the fourth module by the distance, such that the first, second, third, and fourth modules are disposed in a checkered pattern; and
a processing device coupled with the plurality imaging modules, to process the light field and provide a three-dimensional image data of the surface, based at least in part on a result of the processing.

8. The system of claim 7, wherein the image sensor is selected from at least one of: a semiconductor charge-coupled device (CCD) or complementary metal-oxide-semiconductor (CMOS).

9. A method, comprising:
capturing a first array of images of a surface of an object with an imaging apparatus, the apparatus comprising a plurality of imaging modules arranged in an array, wherein a module includes a micro lens array, to receive a light field of a surface of an object, a fiber optic taper (FOT) having a first end and a second end, wherein the FOT is coupled with the lens array at the first end, to transfer the light field to the second end, and an image sensor coupled with the second end of a fiber optic image transferring device, to register the transferred light field and provide the registered light field for further processing, wherein the first end of the FOT is tapered relative to the second end of the FOT, wherein the array of the plurality of imaging modules comprises at least a first row that includes at least first and second modules, and a second row that includes at least third and fourth modules, wherein the first row is disposed parallel and adjacent to the second row, wherein the first and second imaging modules in the first row are disposed at a distance from each other, wherein the third and fourth imaging modules in the second row are disposed at the distance from each other, wherein the first module is shifted relative to the third module by the distance, and wherein the second module is shifted relative to the fourth module by the distance, such that the first, second, third, and fourth modules are disposed in a checkered pattern, wherein the distance is defined in part by a size of the fiber optic image transferring device;
shifting the object or the apparatus by the distance relative to the apparatus or the object respectively; and
capturing a second array of images of the surface of the object with the imaging apparatus, wherein the first and second array of images comprise an image of the surface of the object.

10. The method of claim 9, further comprising: disposing the imaging apparatus over the surface of the object.

11. The method of claim 9, wherein the apparatus comprises a processing device coupled with the plurality of imaging modules, wherein the method further comprises: processing the first and second arrays of images, to produce the image of the surface, wherein the processing includes stitching the first and second arrays of images.

12. A method, comprising:
providing a plurality of imaging modules, including:
forming at least a first row that includes at least first and second modules, including disposing the first and second imaging modules at a distance from each other;
forming a second row that includes at least third and fourth modules, including disposing the third and fourth imaging modules at the distance from each other; and
disposing the first row parallel and adjacent to the second row, including placing the first module to be shifted relative to the third module by the distance, and placing the second module to be shifted relative to the fourth module by the distance, such that the first, second, third, and fourth modules are disposed in a checkered pattern,
wherein an imaging module of the plurality of imaging modules includes a fiber optic taper (FOT) having a first end and a second end, wherein the first end of the FOT is tapered relative to the second end of the FOT, wherein providing the plurality of imaging modules further includes, for each imaging module:
coupling the first end of the FOT with a lens array, wherein the lens array is to receive at least a portion of a light field of a surface of an object, and wherein the FOT is to transfer the portion of the light field from the first end to the second end of the FOT; and
coupling an image sensor with the second end of the FOT, to register the transferred portion of the light field and provide the registered portion of the light field for further processing.

13. The method of claim 12, further comprising:
coupling the first, second, third, and fourth imaging modules with a processing device, to process the first and second portions of the light fields to obtain the light field of the surface of the object.

* * * * *